Oct. 20, 1964   M. LEVEY ETAL   3,153,579
EXHAUST GAS SUPPRESSOR FOR MOTOR VEHICLES
Filed May 22, 1961
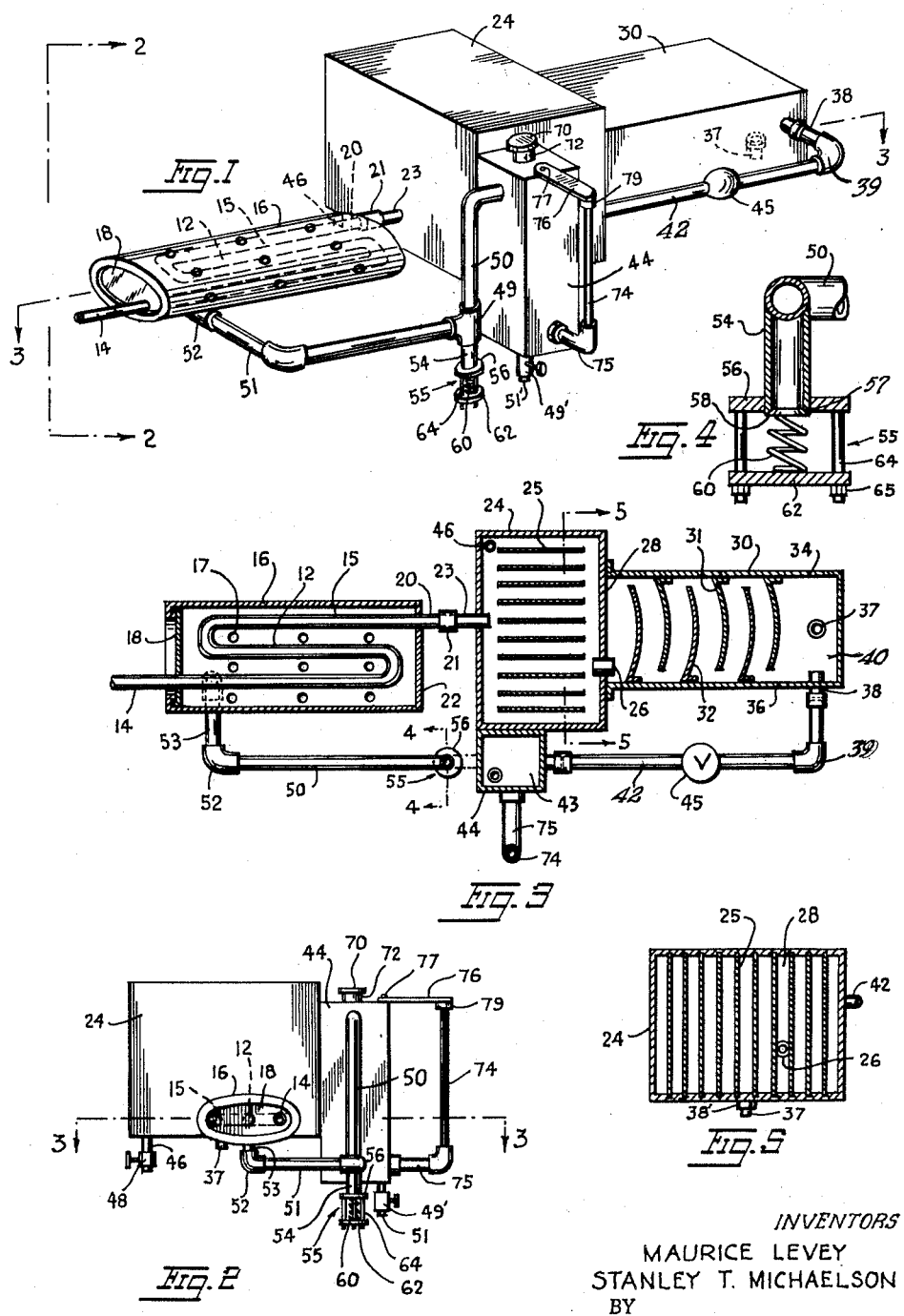
INVENTORS
MAURICE LEVEY
STANLEY T. MICHAELSON
BY
*Zoltan Polschek*
ATTORNEY 3,153,579
EXHAUST GAS SUPPRESSOR FOR
MOTOR VEHICLES
Maurice Levey, 1700 Park Ave., Asbury Park, N.J., and Stanley T. Michaelson, 4 Brookfall Road, Highland Park, N.J.
Filed May 22, 1961, Ser. No. 111,733
4 Claims. (Cl. 23—260)

This invention concerns an exhaust gas treatment system for engines and other apparatus emitting hot, noxious gases.

According to the invention there is provided a system having chambers providing successive stages of cooling and condensation of hot gases emitted under pressure from an engine or other source of noxious gas. In the first cooling chamber there is a sinuous conduit providing a tortuous path for the hot gases. In the second chamber the gases are broken up into a plurality of parallel paths and expanded to reduce their pressure while being cooled to condense them. In the third chamber the gases are further expanded and cooled. From the third chamber, the gases are subjected to chemical action in a treatment chamber where noxious parts of the gases are either removed or chemically converted. From the chemical treatment chamber, part of the gases are either removed or chemically converted. From the chemical treatment chamber, part of the gases are discharged through a valve controlled port to the atmosphere, while the remainder of the gases in a cooled condition are fed back to the conduit in the first chamber to dilute the hot gases under pressure entering the conduit. The system serves as a muffler of objectionable sounds in addition to treating and filtering the exhaust gases.

It is therefore one object of the invention to provide a system for treating hot exhaust gases including a succession of expansion and cooling chambers, a fluid treatment chamber, and a reentrant branch for diluting the hot exhaust gases with treated and cooled gas.

Another object is to provide a system of the character described wherein the reentrant branch has a valved outlet to the atmosphere.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of apparatus embodying the system according to the invention.

FIG. 2 is a front end elevational view taken on line 2—2 of FIG. 1.

FIG. 3 is a cross sectional view taken on line 3—3 of FIG. 2.

FIG. 4 is a sectional view on an enlarged scale of a valve device employed in the system taken on line 4—4 of FIG. 3.

FIG. 5 is a sectional view of an expansion and cooling chamber taken on line 5—5 of FIG. 3.

Referring to the drawing, there is shown a pipe or conduit 12 having an inlet end 14 which may be connected to an engine manifold or other source of hot, noxious exhaust gases. The conduit is bent to sinuous form to provide a plurality of courses 15 longitudinally of a first cylindrical chamber 16 having holes 17 in its side walls. The inlet passes through an end head 18 of the chamber 16. The outlet end 20 of the conduit passes through end 22 of the chamber 16 and is connected by coupling 21 to inlet 23 of a second chamber 24. Chamber 24 is a rectangular closed box in which are a plurality of flat spaced parallel rectangular plates or partitions 25 dividing the box into a plurality of parallel flat passages and secured between top and bottom walls.

The chamber has an outlet connection 26 which opens through rear wall 28. Chamber 30 is a rectangular box in which are two groups of curved baffle plates 31, 32. One group of plates 31 is secured to side wall 34. The other group of plates 32 is secured to opposite side wall 36. The plates are spaced from each other and extend alternately across the chamber so that gases passing through the chamber must follow a tortuous path. The chamber has an outlet 38 near its closed end 40 on side wall 36. A pipe 42 is connected to outlet 38 by coupling 39. The pipe 42 is connected near the bottom of a chemical treatment tank 44 containing a suitable chemical 43. The chemical may be porous activated carbon or other solids in porous or granular form. The chemical is preferably a liquid. A one-way valve 45 may be inserted in pipe 42 to prevent flow of the liquid chemical back to chamber 30. A suitable liquid for treating and cleaning the gas may be a mixture of hydrogen peroxide and glycerine, with colloidal carbon in suspension. Chamber 30 has a drain pipe 37 and valve 38'.

A drain pipe 46 controlled by a valve 48 is provided at the bottom of chamber 24 for draining off liquid collecting therein. An outlet is provided from tank 44 by a pipe 50 connected near the top of the tank. The other end of pipe 50 is connected by a T-fitting 49 to a branch pipe 51. The pipes 50 and 51 serve as part of a reentrant branch in the system. The pipe 51 is connected by a coupling fitting 52 to a branch inlet 53 connected to pipe 12 near the inlet end 14 of the pipe 12. The inlet end of pipe 53 is disposed in a vacuum caused by the inrush of exhaust gases from the manifold of the engine. A one-way pressure release valve 55 is connected to pipe 50 via a short pipe 54.

The valve 55 is shown to best advantage in FIGS. 1, 2 and 4. This valve includes an upper annular ring 56 connected to the bottom end of pipe 54. The pipe 54 has a beveled end 57. A disk 58 with beveled edge seats in the bottom end of pipe 54 and is held thereat by one end of a coil spring 60. The other end of spring 60 is secured to a disk 62 supported on posts 64 provided with nuts 65 on threaded ends of the posts. The disk 58 yields under pressure of gas in pipes 50, 54 to permit discharge of air to the atmosphere from the bottom of pipe 54.

A cap 70 is provided on nipple 72 at the top of tank 44 for filling the same with chemical 43. A glass gauge tube 74 may be provided to show the level of liquid chemical 43 in the tank. This tube is vertically disposed and supported by a pipe 75 at its bottom end connected to the bottom of the tank. The top of the tube is engaged in a cup 79 on a bracket arm 76 attached by screws 77 to the top of the tank.

In operation of the system, the apparatus is mounted on a vehicle having an engine exhaust to be treated, or the apparatus may be installed in a stationary mounting with inlet 14 connected to the source of hot exhaust gases to be treated.

The hot exhaust gases passing through the sinuous pipe 12 are cooled in the first chamber 16. This chamber has holes 17 in its wall to permit air to pass through the chamber and around the pipe for cooling the gas passing therethrough.

The partially cooled gas is then passed to chamber 24. There the gas is expanded and divided into a plurality of parallel paths by the partitions 25. The gas is further cooled and somewhat silenced due to expansion and breaking up of the gas stream, in chamber 24. Then the gas passes to chamber 30 where it is further expanded, cooled and silenced as the gas passes a tortuous path P around the curved baffle plates. Any liquid which collects in chamber 24 may be drained off by pipe 46 at periodic intervals when valve 48 is opened. Liquid collecting in chamber 30 may be discharged via drain pipe 37 controlled by valve 39 connected to the bottom of the chamber. Used chemical 43 can be drained out of tank 44 by a drain pipe 49' controlled by valve 51'.

The cooled gas then passes to tank 44 where it is treated by chemical 43.

Part of the treated gas leaving the tank passes out of valve 55 and the remainder reenters pipe 12 to dilute the hot, noxious gases entering this pipe.

The entire system thus acts to condense, cool, chemically treat, silence and discharge exhaust gases The successive chambers coact to subject the exhaust gases to expansion and treatment in a series of stages so that they are finally discharged in harmless, colorless form and quiet condition.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A treatment apparatus for hot, noxious exhaust gases emitted under pressure from a source thereof, a conduit having an inlet for connection to said source, a first air cooled chamber, said conduit having a sinuous form in said chamber, a second chamber having an inlet, said conduit having an outlet end and connected to the inlet of the second chamber, a plurality of partitions dividing the second chamber into a plurality of parallel passages, a third chamber connected to the second chamber, said second chamber having an outlet opening into the third chamber, a plurality of staggered baffle plates in the third chamber defining a tortuous passage for gas passing therethrough, a vertically disposed fluid chemical treatment tank, a pipe connecting the third chamber to the tank, and another pipe connecting the tank to the first named inlet for diluting hot gases therein by chemically treated cooled gas, and a valved outlet connected to said other pipe for exhausting part of the chemically treated cooled gases to the atmosphere, each of the second and third chambers and said tank having valve controlled drain pipes for selectively draining liquid therefrom, each of the baffle plates in the third chamber being curved and alternately connected to opposite walls of the third chamber, said valved outlet including a spring biased element normally holding said valved outlet closed with predetermined pressure.

2. A treatment apparatus for hot, noxious exhaust gases emitted under pressure from a source thereof, a conduit having an inlet for connection to said source, a first air cooled chamber, said conduit having a sinuous form in said chamber, a second chamber having an inlet, said conduit having an outlet end and connected to the inlet of the second chamber, a plurality of partitions dividing the second chamber into a plurality of parallel passages, a third chamber connected to the second chamber, said second chamber having an outlet opening into the third chamber, a plurality of staggered baffle plates in the third chamber defining a tortuous passage for gas passing therethrough, a vertically disposed fluid chemical treatment tank, a pipe connecting the third chamber to the tank, and another pipe connecting the tank to the first named inlet for diluting hot gases therein by chemically treated cooled gas, and a valved outlet connected to said other pipe for exhausting part of the chemically treated cooled gases to the atmosphere, each of the second and third chambers and said tank having valve controlled drain pipes for selectively draining liquid therefrom, each of the baffle plates in the third chamber being curved and alternately connected to opposite walls of the third chamber, said valved outlet including a spring biased element normally holding said valved outlet closed with predetermined pressure, said tank having a vertically disposed transparent gauge connected thereto for indicating the level of fluid chemical in the tank, said partitions each being a rectangular, flat plate secured between opposite walls of the second chamber so that the second chamber serves to expand exhaust gas therein to divide the same into a plurality of parallel streams, and partially to silence the same in passage through the second chamber.

3. A treatment apparatus for hot, noxious exhaust gases emitted under pressure from a source thereof, a conduit having an inlet for connection to said source, a first air cooled chamber, said conduit having a sinuous form in said chamber, a second chamber having an inlet, said conduit having an outlet end and connected to the inlet of the second chamber, a plurality of partitions dividing the second chamber into a plurality of parallel passages, a third chamber connected to the second chamber, said second chamber having an outlet opening into the third chamber, a plurality of staggered baffle plates in the third chamber defining a tortuous passage for gas passing therethrough, a vertically disposed fluid chemical treatment tank, a pipe connecting the third chamber to the tank, and another pipe connecting the tank to the first named inlet for diluting hot gases therein by chemically treated cooled gas, and a valved outlet connected to said other pipe for exhausting part of the chemically treated cooled gases to the atmosphere, each of the second and third chambers and said tank having valve controlled drain pipes for selectively draining liquid therefrom, and a one-way valve connected in the first named pipe between the third chamber and tank to prevent fluid from passing from the tank to the third chamber, the first named pipe being connected near the bottom of the tank, said other pipe being connected near the top of the tank above the level of fluid therein.

4. A treatment apparatus for hot, noxious exhaust gases emitted under pressure from a source thereof, a conduit having an inlet for connection to said source, a first air cooled chamber, said conduit having a sinuous form in said chamber, a second chamber having an inlet, said conduit having an outlet end and connected to the inlet of the second chamber, a plurality of partitions dividing the second chamber into a plurality of parallel passages, a third chamber connected to the second chamber, said second chamber having an outlet opening into the third chamber, a plurality of staggered baffle plates in the third chamber defining a tortuous passage for gas passing therethrough, a vertically disposed fluid chemical treatment tank, a pipe connecting the third chamber to the tank, and another pipe connecting the tank to the first named inlet for diluting hot gases therein by chemically treated cooled gas, and a valved outlet connected to said other pipe for exhausting part of the chemically treated cooled gases to the atmosphere, each of the second and third chambers and said tank having valve controlled drain pipes for selectively draining liquid therefrom, and a one-way valve connected in the first named pipe between the third chamber and tank to prevent fluid from passing from the tank to the third chamber, the first named pipe being connected near the bottom of the tank, said other pipe being connected near the top of the tank above the level of fluid therein, each of the baffle plates in the third chamber being curved and alternately connected to opposite walls of the third chamber, said valved outlet including a spring biased element normally holding said valved outlet closed with predetermined pressure.

References Cited in the file of this patent

UNITED STATES PATENTS

| | | |
|---|---|---|
| 996,205 | Bergha | June 27, 1911 |
| 2,115,228 | Lundquist | Apr. 26, 1938 |
| 2,966,036 | Stowens | Dec. 27, 1960 |

FOREIGN PATENTS

| | | |
|---|---|---|
| 376,124 | Great Britain | July 7, 1932 |